United States Patent [19]

Bott

[11]  4,146,198
[45]  Mar. 27, 1979

[54] VEHICLE ARTICLE CARRIER

[76] Inventor: John A. Bott, 931 Lakeshore Dr., Grosse Pointe Shores, Mich. 48236

[21] Appl. No.: 798,577

[22] Filed: May 19, 1977

[51] Int. Cl.² .............................................. B60R 9/00
[52] U.S. Cl. ...................................... 224/32 A; 296/3
[58] Field of Search .................... 224/42.1 E, 42.1 R, 224/42.1 F, 42.1 G, 42.1 D, 42.1 B; 296/3, 37.7; 211/182; 52/718, 758 D

[56]         References Cited
       U.S. PATENT DOCUMENTS

| 2,475,903 | 7/1949 | Klas | 224/42.1 D |
| 2,911,274 | 11/1959 | Grube | 52/718 |
| 3,208,119 | 9/1965 | Seckerson | 52/718 |
| 3,339,813 | 9/1967 | Barenyi | 224/42.1 E |
| 3,722,765 | 3/1973 | Binding | 224/42.1 E |

Primary Examiner—Trygve M. Blix
Assistant Examiner—Kenneth W. Noland
Attorney, Agent, or Firm—Harness, Dickey & Pierce

[57]          ABSTRACT

An article carrier comprising an article supporting panel member which is adapted to be secured to a portion of a motor vehicle and having a device provided thereon for securing a rack member enclosing a perimeter area thereof. Additionally, a second panel member may also be provided between the article supporting panel member and vehicle portion to aid in dispersing the article load over a greater surface area of the vehicle.

22 Claims, 8 Drawing Figures

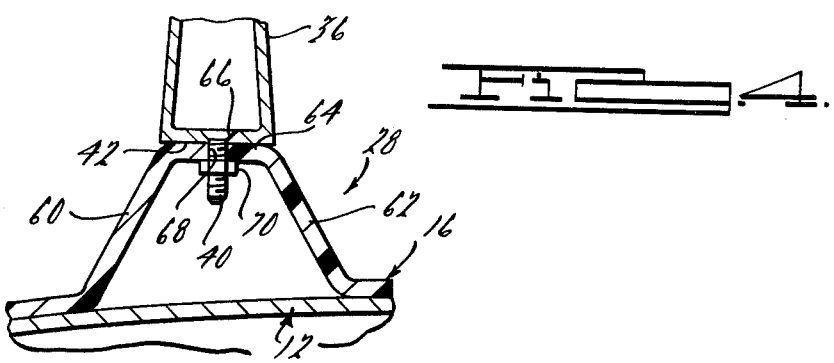
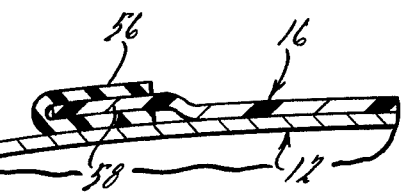
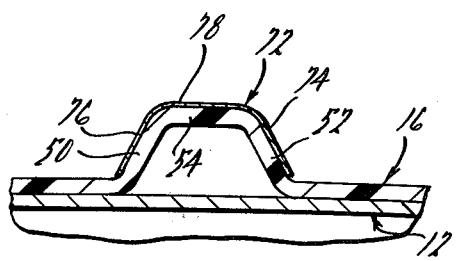
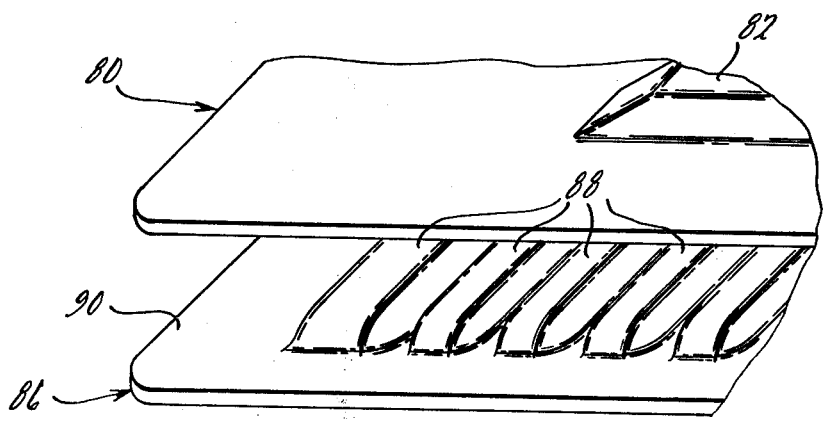
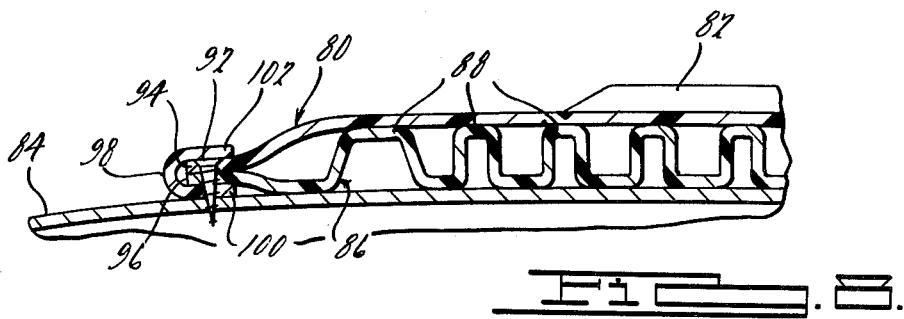

VEHICLE ARTICLE CARRIER

BACKGROUND AND SUMMARY OF THE INVENTION

The present invention relates generally to article carriers which are adapted to be secured to a portion of a motor vehicle and more particularly to such carriers comprising an article supporting panel member which is adapted to allow a rack member to be secured thereto.

There are a wide variety of article carriers suitable for attachment to various portions of a motor vehicle currently available on the market. Generally, these article carriers comprise a rack portion enclosing a generally rectangular area which is secured to a portion of the motor vehicle and may include a plurality of longitudinally extending slat members spaced in substantially parallel relationship across the enclosed area. The rack member serves to retain the articles in position upon the rib members which support the article in a spaced relationship from the vehicle surface so as to prevent marring of the vehicle surface by the article as well as to aid in dispersing the weight of the article over a greater surface area of the vehicle. As each of the components of such carriers must be separately assembled and individually secured to the vehicle, the time required to install such racks is considerable. Further, as each of these individual members is generally separately secured, numerous holes must be provided in the surface portion of the vehicle which may collect corrosion causing contaminants from the environment as well as providing additional openings into the interior of the vehicle which may be subject to leakage. Further, it may be desirable to carry various articles which are of a size as to fit between the longitudinally extending rib members and thus rest upon the painted surface of the vehicle. These articles may result in marring of the painted surface due to movement during transportation thereof.

Accordingly, the present invention provides an article carrier adapted to be secured to a portion of a motor vehicle which overcomes these problems. The article carrier of the present invention comprises a base member which may include a plurality of integrally formed spaced substantially parallel longitudinally extending rib members which act to disperse the load of the article over substantially the entire surface area of the panel member. Further, the panel member is adapted to have an enclosing rack member secured thereto so as to restrain articles supported by the panel within the enclosed area. As the panel member covers substantially the entire area enclosed by the rack member, any marring of the surface of the motor vehicle is substantially eliminated. Further, as the panel member comprises a single piece, it may be easily secured to the motor vehicle with a minimum number of fasteners thus resulting in substantially reduced installation time as well as eliminating the necessity of providing numerous holes through the surface portion of the vehicle. This not only reduces the possibility of leakage occurring through these holes, but also makes it possible for an individual no longer desiring the rack on the vehicle to more easily remove and repair the openings provided therein. In another embodiment, the article carrier of the present invention includes an intermediate panel member having a plurality of transversely extending rib members provided therein which acts to further insure adequate dispersal of the load exerted by the article being carried upon the article supporting panel member.

Additional advantages and features of the present invention will become apparent from the following description of the preferred embodiments taken in conjunction with the appended claims and the drawings.

BRIEF DESCRIPTION OF THE DRAWINGS

FIG. 4 is an enlarged detail view of a portion of the article carrier of FIG. 1 illustrating the means for securing the rack member to the article supporting panel member;

FIG. 5 is a sectional view of an edge portion of the article carrier of the present invention illustrating a trim member provided thereon;

FIG. 6 is a sectional view of a single longitudinally extending supporting rib of the article supporting panel member having a decorative trim strip secured thereto;

FIG. 7 is a perspective view of a portion of another embodiment of the present invention illustrating an article supporting panel member and an intermediate load dispersing panel member; and FIG. 8 is a sectional view of a portion of the embodiment of FIG. 7 shown in an installed relationship to a portion of a motor vehicle.

DESCRIPTION OF THE PREFERRED EMBODIMENTS

Figure 1:
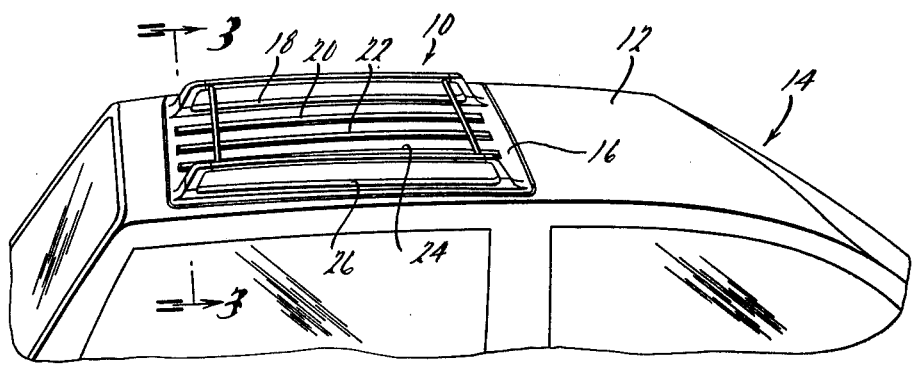
FIG. 1 is a perspective view of a portion of a motor vehicle having an article carrier in accordance with the present invention secured to a roof portion thereof.

Referring now to FIG. 1, there is shown therein an article carrier in accordance with the present invention generally designated 10 secured to a roof portion 12 of a motor vehicle 14. Article carrier 10 comprises an article supporting panel member 16 engaging the roof portion 12 of the vehicle 14 and having a plurality of spaced longitudinally extending substantially parallel rib members 18, 20, 22, 24, and 26 integrally formed therein of a length slightly less than the longitudinal length of panel member 16.

Figure 2:
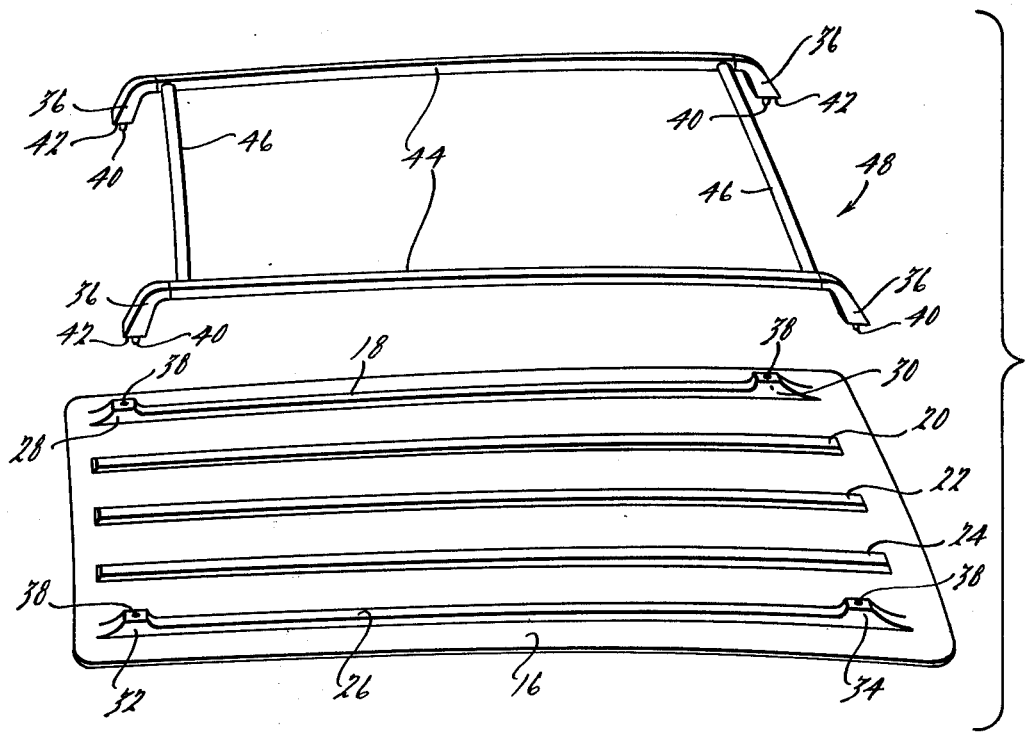
FIG. 2 is an exploded perspective view of the article carrier of FIG. 1.

As best seen with reference to FIG. 2, panel member 16 comprises a generally rectangular shaped elongated member which may be fabricated from a sheet of plastic composition material such as by vacuum forming and has provided therein a plurality of integrally formed mounting pads 28, 30, 32 and 34 provided at opposite ends of the outermost longitudinally extending rib members 18 and 26. Each of the mounting pads 28, 30, 32 and 34 is adapted to have an upwardly extending stanchion 36 secured thereto and accordingly is provided with an aperture 38 extending therethrough which is adapted to receive securing means 40 provided in the bottom 42 of each stanchion 36. Each of the stanchions has secured thereto a longitudinally extending rod member 44 between which transverse rod members 46 extend so as to form a perimeter enclosing rack member 48 having dimensions slightly less than the length and width of panel member 16. Rack member 48 thus comprising the upwardly projecting stanchions 36 and perimeter extending rails 44 and 46 serves to confine articles to be carried upon panel member 16 within the respective enclosed area.

Figure 3:
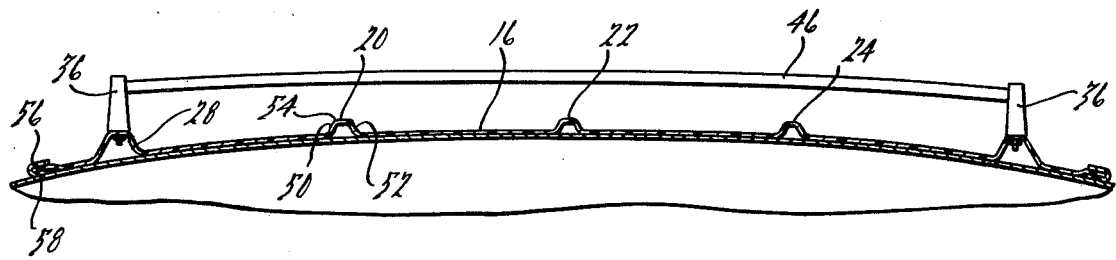
FIG. 3 is a transverse sectional view of the article carrier of FIG. 1, the section being taken along line 3—3 thereof.

As shown in FIG. 3, each of the longitudinally extending ribs 18 through 26 comprises upwardly converging sidewall portions 50 and 52 and a generally horizontally extending article supporting surface 54 interconnecting the upper ends thereof. While only five such longitudinally extending ribs 18 through 26 are shown in the particular embodiment illustrated, it should be understood that any number of such rib members may be easily provided in panel member 18. Also, as shown in FIG. 3, there is provided a decorative molding strip 56 enclosing the peripheral edge 58 of panel member 16 as will be described in greater detail below.

Referring now to FIG. 4, there is shown a mounting pad 28 provided on the panel member 16 to which is secured an upwardly extending stanchion 36. As shown therein, mounting pad 28 has upwardly converging sidewall portions 60 and 62 and a generally horizontally extending top wall 64 which engages and supports the lower surface 42 of stanchion 36. Apertures 66 and 68 are provided in the lower surface 42 of the upwardly extending stanchion 36 and the top wall 64 of the panel member 16 through which is disposed securing device 40 in the form of a threaded screw having a nut 70 secured thereto. It should be noted that should it be desirable, nut 70 may be embedded or secured in a suitable manner to mounting pad 28 thereby allowing installation and/or removal of stanchions 36 subsequent to installation of the panel member upon the vehicle. Alternatively, however, it may be desirable to secure nut 70 to the interior of the upwardly projecting stanchion 36 and to assemble the stanchion to the panel member 16 by insertion of the screw through opening 66 provided in the mounting pad 28 prior to the assembly of panel member 16 to the vehicle. Each of mounting pads 30, 32 and 34 are substantially identical to mounting pad 28 and thus further description thereof is believed unnecessary.

As previously mentioned and shown in detail in FIG. 5, a molding strip 56 may be provided extending around the entire periphery of panel member 16 and may be in the form of a decorative strip which overlies and encloses the peripheral edge portion 58 thereof. Molding strip 56 may be secured to vehicle surface 12 and to panel member 16 by a suitable adhesive and in one form may be fabricated from a relatively rigid material so as to aid in retaining panel member 16 in position upon the vehicle 14.

As shown in FIG. 6, each of the longitudinally extending rib sections may also be provided with a decorative trim strip 72 having a complementary shape including upwardly converging sidewall portions 74 and 76 and a generally horizontally extending upper article supporting top wall 78 provided thereon. Generally, trim strips 72 will be coextensive with the longitudinally extending rib sections 18 through 26 and may be easily fabricated from a relatively thin polished sheet metal such as for example stainless steel. They may be easily secured to the rib portions 18 through 26 of the panel member 16 in any suitable manner such as for example by a suitable adhesive or the like. These trim strips will not only provide a decorative accent to panel member 16 but will also provide a long-lasting, hard-wearing article engaging supporting surface thereon. Further, the downwardly extending sidewall portions 74 and 76 will serve to reinforce the upwardly projecting rib sidewalls 50 and 52 so as to assist in dispersing the weight of an article supported thereon over a greater surface area of the vehicle.

In certain applications such as for example when a heavy load is desired or expected to be carried upon the article carrier of the present invention, it may be desirable to provide an additional load dispersing panel member between the article supporting panel member and the surface of the vehicle. Such an embodiment is disclosed in FIGS. 7 and 8 and comprises an article supporting panel member 80 substantially identical to panel member 16 described with reference to FIGS. 1 through 6 which may include longitudinally extending integrally formed ribs 82 as well as mounting pad provisions suitable to accommodate a plurality of upwardly extending stanchions. Between article supporting panel member 80 and a portion 84 of a vehicle to which the article carrier is to be secured, there is provided an intermediate panel member 86 having a plurality of corrugated rib members 88 forming an interior cross sectional shape substantially as shown in FIG. 8. Intermediate panel member 86 will also be provided with a relatively flat perimeter portion 90 to allow for attachment of both the article carrying panel member 80 and the intermediate panel member 86 to portion 84 of the vehicle. Corrugated rib members 88 formed in the interior of the intermediate panel member will be disposed so as to extend in a generally perpendicular direction relative to the longitudinally extending rib members 82 formed in the article supporting panel member 80 and will thereby serve to disperse the loading exerted upon each of the longitudinally extending rib members 82 over a larger cross-sectional surface area of the vehicle portion 84 to which the article carrier is secured. This load dispersal will insure that damage to the vehicle surface such as denting as may occur should the vehicle be traveling down a relatively rough road and/or carrying an excessively heavy article will be prevented.

As shown in FIG. 8, both the article carrier panel member 80 and the intermediate panel member 86 may be secured to a suitable portion 89 of a vehicle by means of a single fastener 92 extending therethrough such as for example a sheet metal screw. In order to conceal the double layer of the edges 94 and 96 of the article supporting panel member 80 and the intermediate panel member 86 respectively, it may be desirable to provide a perimeter molding strip 98 which also may be secured by fastener 92. In this case the perimeter molding strip 98 will generally be fabricated from a relatively flexible material and formed in a generally U-shaped cross-section. The lower leg 100 of molding strip 98 may then be placed upon portion 84 of the vehicle and secured thereto by fastener 92 extending through the upper article carrying panel member 80 and the intermediate panel member 86 and engaging portion 84 of the vehicle. Thereafter, the upper leg 102 of the molding strip 98 will be allowed to fold back over article carrying panel member 80 and conceal fastener 92 thereby providing a decorative finished edge appearance to the article carrier while allowing use of a relatively simple inexpensive means for securing the article carrier of the present invention to the vehicle. Intermediate panel member 86 may be easily fabricated from a plastic composition material in a similar manner to the fabrication of the article carrying panel member described above such as for example by any suitable plastic forming process such as vacuum forming.

There is thus disclosed herein a unique article carrier which may be easily and rapidly installed upon any generally horizontally extending surface portion of a motor vehicle with a minimum of effort. Also, the panel member will provide a protective load dispersing surface for supporting articles to be carried thereon and which prevents such articles from scratching or otherwise damaging the surface portion of the vehicle. Further, as the panel member is adapted to allow a rack to be secured thereto and includes integrally formed rib members, only a minimum number of vehicle attachment points are required thereby enabling the use of fewer screws or should it be desired, enabling the use of an adhesive for effecting the attachment. Should it be desirable such as when it is anticipated that extremely heavy loads will be carried on the article carrier of the present invention, an intermediate load dispersing panel member may be easily installed in like manner. The provision of trim strips on the article supporting rib surfaces offer an aesthetically pleasing accent to the article carrier as does the perimeter molding strip. Further, the trim strips provide a durable long-wearing article supporting surface. It should also be noted that while the ribs provided on the article carrying panel member are shown extending in a generally longitudinal direction and the intermediate panel corrugations have been described as extending generally perpendicular thereto, either of these rib members may be oriented so as to extend in substantially any direction such as for example the article carrying members may be arranged to extend transversely of the vehicle and the intermediate panel ribs may be disposed to extend longitudinally thereof or even diagonally should this be desirable for any particular reason.

While it will be apparent that the preferred embodiments of the invention disclosed are well calculated to provide the advantages above stated, it will be appreciated that the invention is susceptible to modification, variation, and change without departing from the proper scope or fair meaning of the subjoined claims.

I claim:

1. An article carrier for a motor vehicle comprising: an article supporting panel member adapted to be secured to a portion of a motor vehicle; said panel being of a molded monolithic structure and disposed in contiguous relation directly upon the associated surface of the vehicle; article constraining means defining an article transport area above at least a portion of said panel member; and mounting means for securing said article constraining means at a position adjacent said transport area, whereby said article constraining means and said panel member are cooperable to retain an article in position within said area.

2. An article carrier as set forth in claim 1 wherein said article constraining means includes a plurality of spaced stanchions, said mounting means comprise a plurality of spaced upwardly projecting mounting pads, each of said mounting pads being adapted to receive and support one of said plurality of stanchions, and fasteners securing said stanchions to said mounting pads.

3. An article carrier as set forth in claim 2 wherein said panel member further includes a plurality of substantially parallel elongated spaced ribs and said mounting pads are disposed on opposite ends of each of the two most outwardly disposed ribs.

4. An article carrier as set forth in claim 3 wherein said ribs and said mounting pads are integrally formed in said panel member.

5. An article carrier as set forth in claim 4 wherein said panel member is fabricated from a plastic composition.

6. An article carrier as set forth in claim 3 wherein said panel member is provided with a perimeter flange portion adapted to accommodate fastening means for securing said panel member to said motor vehicle.

7. An article carrier as set forth in claim 6 wherein said article carrier further comprises molding means surrounding and concealing the peripheral edge of said panel member.

8. An article carrier as set forth in claim 7 wherein said panel member and said molding means are secured to said motor vehicle by common fastening means.

9. An article carrier as set forth in claim 8 wherein said fastening means are screws and said molding means includes a deformable portion overlying said panel member so as to conceal said screws.

10. An article carrier as set forth in claim 1 wherein said panel member further includes means for dispersing the weight of an article supported thereon.

11. An article carrier as set forth in claim 10 wherein said load dispersing means comprise a plurality of substantially parallel spaced elongated ribs provided on said panel member.

12. An article carrier as set forth in claim 11 wherein said ribs are integrally formed in said panel member.

13. An article carrier as set forth in claim 12 wherein said ribs are defined by spaced elongated upwardly converging sidewalls and an article engaging top wall.

14. An article carrier as set forth in claim 12 further comprising trim strips secured to and overlying each of said ribs.

15. An article carrier as set forth in claim 10 wherein said load dispersing means comprise an intermediate panel member having a plurality of integrally formed elongated spaced ribs provided therein, said intermediate panel being adapted to be disposed between said article supporting panel member and said vehicle.

16. An article carrier as set forth in claim 15 wherein said load dispersing means comprise a plurality of substantially parallel spaced elongated ribs provided on said panel member.

17. An article carrier as set forth in claim 16 wherein said article supporting panel member ribs are elongated in a first direction and said ribs of said intermediate panel are elongated in a direction other than said first direction.

18. An article carrier as set forth in claim 17 wherein said ribs of said intermediate panel extend generally perpendicularly to said first direction.

19. An article carrier as set forth in claim 18 wherein said article supporting panel member and said intermediate panel member are secured to said portion of said vehicle by common fastening means.

20. An article carrier as set forth in claim 19 wherein said fastening means comprise a molding member extending around and concealing the peripheral edge of said panel members and includes a lower portion secured to said portion of said vehicle and an upper portion overlying said panel members and retaining said members in mutual engagement.

21. An article carrier as set forth in claim 20 wherein said fastening means further comprise common fasteners securing said panel members and said molding member to said vehicle, and said upper portion is disposed so as to conceal said fasteners.

22. An article carrier as set forth in claim 21 wherein said upper portion of said molding means is deformable so as to allow installation of said fasteners.

* * * * *